US012685943B1

(12) United States Patent
Stover

(10) Patent No.: US 12,685,943 B1
(45) Date of Patent: Jul. 21, 2026

(54) COLLECTIBLE PLUSH TOYS FEATURING PERMANENTLY APPLIED TATTOO ARTWORK THROUGH SUBLIMATION PRINTING ON SOFT POLYMERIC FABRIC

(71) Applicant: Tyler Stover, Tamarac, FL (US)

(72) Inventor: Tyler Stover, Tamarac, FL (US)

(73) Assignee: Tattoo Zoo LLC, Tamarac, FL (US)

( * ) Notice: Subject to any disclaimer, the term of this patent is extended or adjusted under 35 U.S.C. 154(b) by 15 days.

(21) Appl. No.: 18/945,753

(22) Filed: Nov. 13, 2024

(51) Int. Cl.
*A63H 3/02* (2006.01)
*A63H 9/00* (2006.01)
*B41M 5/025* (2006.01)
*D06P 5/28* (2006.01)

(52) U.S. Cl.
CPC ................. *A63H 3/02* (2013.01); *A63H 9/00* (2013.01); *B41M 5/0256* (2013.01); *D06P 5/004* (2013.01)

(58) Field of Classification Search
CPC ......... A63H 3/02; A63H 9/00; B41M 5/0256; B41M 5/035; D06P 5/004
USPC .......................................................... 446/369
See application file for complete search history.

(56) References Cited

U.S. PATENT DOCUMENTS 5,803,788 A * 9/1998 Penberthy ................ A63H 9/00 446/391
7,887,386 B2 * 2/2011 Yu ............................ A63H 3/02 446/72
8,070,553 B2 * 12/2011 Carnegie .................. A63H 9/00 446/385
8,283,012 B2 * 10/2012 Komorous-Towey .... B32B 5/26 442/295
10,688,006 B2 * 6/2020 Seltzer ................... A61G 17/08
11,207,864 B2 * 12/2021 Berzins ................... B32B 25/20
11,973,917 B2 * 4/2024 Peinado Gutierrez ....................... H04N 1/6044
2008/0156215 A1 * 7/2008 Atkins ................ B41M 5/0256 101/493
2009/0119818 A1 * 5/2009 Ngo ......................... D06Q 1/12 2/244
2010/0035029 A1 * 2/2010 Ngo ......................... D06Q 1/12 428/196
2014/0295730 A1 * 10/2014 Gauci ...................... A63H 9/00 446/369
2020/0290391 A1 * 9/2020 Zhou ...................... B41M 5/506
(Continued)

*Primary Examiner* — Joseph B Baldori
(74) *Attorney, Agent, or Firm* — Sam Pierce

(57) ABSTRACT

The present invention pertains to a line of collectible plush toys featuring permanent, high-resolution tattoo artwork applied to soft polymer-based fabrics, such as mink poly fur, through a specialized sublimation printing process. Each plush toy is uniquely designed to incorporate culturally significant tattoo-style art, created in collaboration with professional tattoo artists, with predefined tattoo placement areas that align with the toy's anatomical features for realistic and aesthetically engaging designs. The sublimation printing process embeds the tattoo artwork directly into the fabric fibers, resulting in a durable, wear-resistant image that retains color vibrancy over time. Additionally, a protective thermal layer may be applied to preserve the tattooed design against environmental factors further. The method of manufacture includes steps for character and tattoo design, pattern digitization, fabric preparation, sublimation printing, precise assembly, and quality assurance, enabling scalable production while preserving each piece's unique artistic integrity.

2 Claims, 5 Drawing Sheets

(56) References Cited

U.S. PATENT DOCUMENTS

| | | | | |
|---|---|---|---|---|
| 2021/0059317 | A1* | 3/2021 | Malcolm | A41B 13/06 |
| 2021/0237497 | A1* | 8/2021 | Fior | B41M 3/12 |
| 2024/0140121 | A1* | 5/2024 | Kim | G03G 15/10 |

* cited by examiner

COLLECTIBLE PLUSH TOYS FEATURING PERMANENTLY APPLIED TATTOO ARTWORK THROUGH SUBLIMATION PRINTING ON SOFT POLYMERIC FABRIC

BACKGROUND OF THE INVENTION

Field of Invention

The present invention pertains to the technical field of collectible plush toys, more specifically to plush toys and stuffed animals enhanced by the integration of indelible, artistically rendered tattoo-style artwork. This invention further relates to the method of manufacturing said plush toys, utilizing sublimation printing on durable polymer-based textile materials to embed high-definition, wear-resistant tattoo illustrations onto the soft fabric exterior. The invention is applicable to various sectors, including collectible merchandise, therapeutic tools, educational resources, and decorative items, with relevance to the fields of toy manufacturing, cultural merchandise, and lifestyle collectibles.

BRIEF SUMMARY OF THE INVENTION

The present invention discloses a novel line of collectible plush toys distinguished by the permanent application of stylized tattoo artwork on a soft, plush exterior. Utilizing advanced sublimation printing techniques, each plush toy incorporates high-resolution tattoo designs on polymer-based fabrics, ensuring the artwork's durability and resistance to wear over time. The plush toys are crafted with strategically designated tattoo areas that align with each animal's anatomy, creating an authentic and visually appealing representation of tattoo culture. This invention bridges traditional plush toys with the aesthetics of tattoo art, appealing to collectors, tattoo enthusiasts, and culturally-minded consumers seeking unique, expressive collectibles that merge art, culture, and craftsmanship.

The invention's design and production methodology enable scalable, high-quality manufacturing while preserving each piece's artistic integrity and tactile appeal, thereby meeting market demands for both originality and durability in the collectible toy sector.

DETAILED DESCRIPTION

Figure 1:
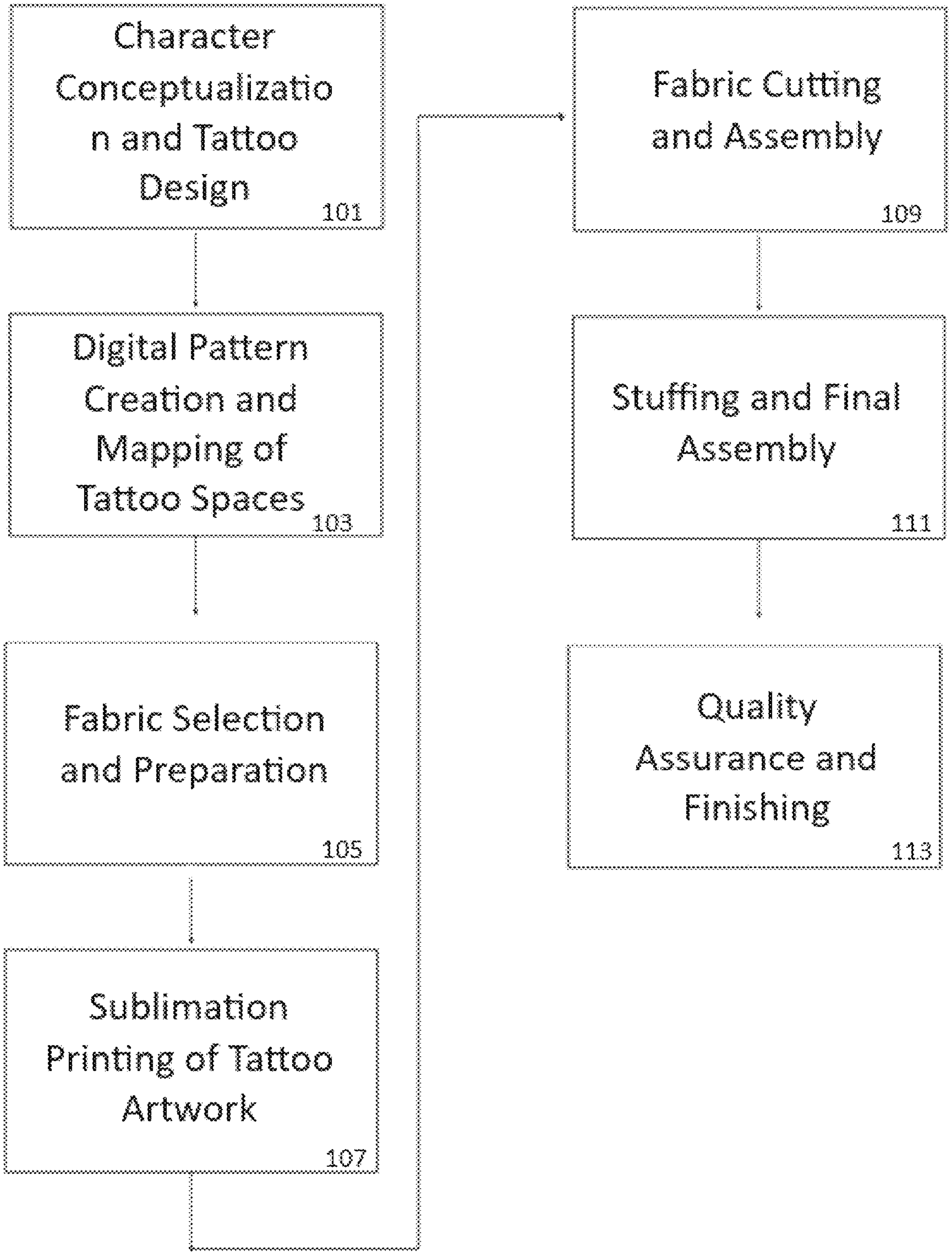
FIG. 1: shows the manufacturing process for the tattooed plush toys involves the conceptualization of character designs, digital pattern mapping, fabric preparation, precise sublimation printing of tattoo artwork, assembly, stuffing, and final quality checks to ensure high-quality, durable plush toys with culturally significant tattoo art.
Figure 2A:
FIGS. 2A-D illustrate tattooed plush animals according to embodiments of the present invention.
Figure 2B:
Figure 2C:
Figure 2D:

The present invention provides a unique line of collectible plush toys, herein referred to as "Tattoo Zoo," characterized by the integration of permanently applied, high-resolution tattoo-style artwork on the exterior surfaces of soft plush animals. The invention introduces an innovative process of fabric selection, design application, and durable printing technology that allows for the embedding of intricate, stylized tattoo art into the plush toy's fabric. Each plush toy is specifically designed to appeal to collectors, art enthusiasts, and consumers drawn to tattoo culture by merging traditional plush toy elements with culturally resonant tattoo designs.

Components of the Invention:

- Plush Body Structure: Each plush animal within the Tattoo Zoo collection is fabricated from a base template, known as the body pattern, which provides the structural form of the plush animal. This body pattern is meticulously designed and digitally rendered to represent the target species or character with anatomical fidelity. The body is fabricated from a specialized mink poly fur, a synthetic polymeric fabric known for its softness, durability, and suitability for high-definition printing. The fabric is selected to optimize tactile experience while also serving as a resilient substrate for the tattoo artwork.

Tattoo Design Space and Placement: The invention specifies predetermined areas on each plush body, referred to as "tattoo design spaces," that are allocated for the tattoo artwork application. These designated areas are strategically placed to enhance visual alignment with the anatomical features of the animal's form. This placement creates a lifelike representation of how tattoo designs would naturally conform to a three-dimensional structure. The tattoo design spaces are precisely mapped onto each digital body pattern to ensure consistent alignment across all manufactured units.

Digitized Tattoo Artwork: Each tattoo design is collaboratively created with professional tattoo artists, ensuring the artwork reflects genuine tattoo aesthetics and cultural authenticity. The tattoo designs are digitized through high-resolution graphic software, allowing for detailed pattern creation that conforms to the plush animal's contours and anatomical structure. This digitized artwork is refined for clarity, scale, and color vibrancy, ensuring it maintains artistic integrity when printed on the fabric. Each design is unique to a specific plush animal, creating a diverse range of collectible pieces within the product line.

Poly Sublimation Printing Technology: The invention employs a specialized poly sublimation printing process, optimized for durability and color fidelity. Poly sublimation printing involves the transfer of the tattoo designs onto the mink poly fur fabric at high temperatures, which causes the solid dye particles to convert into a gas state and infuse directly into the polymer fibers of the fabric. This process ensures that the artwork is not merely on the fabric's surface but is embedded within the fibers, resulting in a permanent, wear-resistant tattoo effect that retains its vibrancy over extensive use and handling. This method contrasts with conventional plush toy designs, where decorative features may degrade or fade over time.

Assembly and Finishing Process: Following the sublimation printing process, the tattooed fabric sections are precisely cut and stitched according to the digitally rendered body pattern, creating a plush animal with the embedded tattoo design integrated seamlessly onto the body. The plush toys are then stuffed with high-quality filling materials that enhance the toy's structure and tactile feel. All seams and stitching are reinforced to maintain durability and prevent deformation, ensuring

- that the plush toy retains its intended shape and quality over extended periods.

Method of Manufacture:

- The invention's production process encompasses the following key steps, each contributing to the fidelity and durability of the final product:

Character Conceptualization and Storyboarding: Each plush toy is initially conceptualized through a character design and storyboarding phase. During this phase, the aesthetic and thematic elements of the tattoo designs are considered, and character traits are developed to provide a unique identity to each plush animal. This conceptualization includes the mapping of tattoo design spaces on the animal's form, enhancing the visual alignment and anatomical realism of the tattoo placement.

Pattern Sampling and Digital Rendering: The body pattern for each plush toy is drafted and refined to capture the accurate anatomical representation of the character. This pattern is digitized into a digital template, facilitating precision in subsequent manufacturing steps, including fabric cutting and tattoo alignment. The digital rendering ensures each plush toy maintains consistent proportions and quality across multiple production cycles.

Tattoo Artwork Digitization and Placement Mapping: Tattoo artwork created by collaborating artists is digitized and scaled to fit within the predefined tattoo design spaces on the digital pattern. This mapping process involves the careful placement of each design to align with the three-dimensional form of the plush toy, providing a lifelike tattoo appearance.

Poly Sublimation Printing on Mink Poly Fur Fabric: The poly sublimation process is performed on sections of mink poly fur fabric, wherein the tattoo artwork is transferred onto the fabric at high temperature and pressure, embedding the design into the fiber structure of the material. This method yields a vibrant and resilient tattoo effect that withstands regular handling and environmental exposure. The poly sublimation process is conducted under controlled conditions to prevent color distortion and ensure precise adherence of the tattoo design.

Fabric Cutting and Precision Assembly: Post-printing, the tattooed fabric sections are cut to match the digital body pattern, ensuring the tattooed areas align seamlessly with the plush animal's structure. The fabric sections are stitched together using reinforced stitching techniques, forming the exterior shell of the plush toy. The assembly process prioritizes alignment, ensuring each tattooed design space matches the intended anatomical placement.

Stuffing and Final Quality Control: The plush toys are filled with high-grade stuffing materials to achieve a balanced form and optimal tactile quality. Each toy undergoes a rigorous quality control process, inspecting for structural integrity, stitching consistency, and design accuracy. Limited-edition models may undergo additional quality checks to verify the fidelity of tattoo designs and structural durability.

Advantages and Technical Novelty:

The present invention addresses and overcomes limitations in conventional plush toy manufacturing through several technical advantages:

Authentic Tattoo Artistry: By collaborating with professional tattoo artists, the invention ensures each design holds artistic credibility and cultural relevance, appealing directly to collectors and enthusiasts of tattoo art.

Durability of Tattoo Design: Through the poly sublimation printing method, the invention ensures that tattoo designs are deeply embedded within the mink poly fur fabric, preventing fading or peeling that typically occurs with surface-level printing techniques.

Realistic Tattoo Placement: The invention's use of predefined tattoo design spaces mapped onto each animal's anatomical structure enhances the lifelike appearance of the tattooed areas, creating an authentic aesthetic unlike any conventional plush toy.

Scalability and Consistency: The use of digital patterning and scalable printing techniques allows for consistent, high-quality production across multiple units, meeting the demands of commercial manufacturing while preserving artistic integrity and durability.

This detailed, integrated approach to design and manufacturing establishes the Tattoo Zoo plush line as a unique and innovative product in the collectible toy market, merging traditional plush toy craftsmanship with contemporary tattoo artistry.

The invention's unique combination of artistic and manufacturing elements results in a highly differentiated plush toy that holds value both as a collectible item and as a culturally significant representation of tattoo art. By utilizing advanced printing and durable materials, this invention not only delivers a visually striking product but also ensures a long-lasting, tactile experience that appeals to a broad range of consumers, including art collectors, tattoo enthusiasts, and mainstream plush toy collectors.

Additional Technical Embodiments:

Customized Tattoo Designs for Limited Editions:

To enhance product exclusivity and meet collector demand, the invention allows for limited-edition plush toys featuring exclusive tattoo artwork created by renowned tattoo artists. These editions may utilize custom color schemes, intricate patterns, or unique iconography, thereby increasing the collectible value of each plush toy. Limited editions undergo additional quality assurance checks to confirm design fidelity and structural integrity, ensuring that they meet heightened consumer expectations for unique collectibles.

Enhanced Durability Through Reinforced Stitching and Seam Techniques:

The invention incorporates specialized stitching techniques that reinforce seams, particularly around areas of high wear, such as limb joints and head attachments. Stitch reinforcement methods, such as double stitching and the use of durable nylon or polyester threads, are applied to prevent tearing or deformation. This approach prolongs the lifespan of the plush toy, enabling it to retain both structural integrity and aesthetic appeal despite repeated handling.

Adaptation for Different Animal Forms and Tattoo Styles:

The invention includes a framework for adapting the core design and manufacturing process to various animal species and anatomical structures. For each new animal form, the body pattern and tattoo design spaces are uniquely tailored to suit the animal's shape, with tattoo styles customized to complement the character traits associated with each species. This adaptability allows for expansion of the Tattoo Zoo product line to include a wide array of animal figures, each with distinct tattoo art reflecting different cultural or stylistic elements.

Thermal Protection Layer for Design Preservation:

To further enhance the durability of the tattoo designs, the invention includes an optional thermal protection layer applied over the tattooed areas. This layer, embedded during the poly sublimation process, provides an additional barrier against environmental wear, fading, and potential damage from washing or exposure to light. The thermal layer is composed of a clear, flexible polymer coating that is imperceptible to touch, preserving the plush fabric's natural feel while extending the vibrancy and clarity of the tattoo artwork.

Extended Line for Lifestyle Accessories and Complementary Products:

The inventive principles applied in the Tattoo Zoo plush line may also be extended to related product categories, including, but not limited to, backpacks, vinyl figures, and other collectible merchandise. By utilizing similar tattoo art and durable printing techniques, these additional products reinforce the brand's identity and appeal across a wider consumer market. The extension to lifestyle accessories allows Tattoo Zoo to reach consumers who value tattoo art in various forms, creating a cohesive brand experience and expanding market reach.

Applications and Use Cases:

The Tattoo Zoo plush line serves a variety of functional and aesthetic purposes, offering unique applications across multiple consumer demographics:

Collectible Merchandise for Art Enthusiasts and Tattoo Culture Aficionados:

Tattoo Zoo plush toys cater to consumers with an interest in art and tattoo culture by providing a collectible item that embodies authentic tattoo artistry. The culturally relevant and visually distinct designs attract collectors and art enthusiasts, making these plush toys suitable for display in art-focused collections.

Therapeutic and Educational Uses in Counseling and Classroom Settings:

The tattooed plush animals can be utilized as educational tools for discussing cultural expressions of art, particularly with adolescents and young adults. In therapeutic settings, the plush toys serve as conversation starters, where the symbolic meanings of each tattoo design can be used to explore personal identity and self-expression. Counselors and educators may use these plush toys to foster discussions on cultural appreciation and the significance of tattoo art in different societies.

Decorative and Gift Items for a Broad Consumer Base:

Tattoo Zoo plush toys have strong decorative appeal, serving as eye-catching items in home decor or as unique gifts for individuals interested in alternative or artistic expressions. The product's aesthetic versatility and high-quality design make it suitable for display in various environments, from homes to art studios and tattoo shops, enhancing its utility as both a collectible and a decor item.

The present invention offers a pioneering approach to plush toy design by merging traditional craftsmanship with high-resolution tattoo artistry through advanced sublimation printing on polymeric fabrics. The invention's commitment to quality, cultural relevance, and aesthetic appeal positions Tattoo Zoo as a distinguished player in the collectible and lifestyle markets, effectively bridging the worlds of plush toys and tattoo culture. Through the described technical processes, material choices, and collaborative artist contributions, the invention fulfills a previously unmet demand for culturally significant and artistically driven plush toys, providing consumers with a unique, high-quality collectible that retains its visual and structural integrity over time.

Detailed Description of Figures

FIG. 1.101—Character Conceptualization and Tattoo Design The process begins with designing each plush toy's character, including creating unique tattoo artwork reflective of cultural tattoo artistry. Collaborations with professional tattoo artists provide authenticity to the designs, which are tailored to align with each animal's personality. The character traits and tattoo placements are carefully planned to enhance the toy's aesthetic and cultural resonance, forming the foundation for each unique plush toy.

FIG. 1.103—Digital Pattern Creation and Mapping of Tattoo Spaces A digital pattern of the plush toy's shape is created, serving as a template for the body structure. This digital pattern includes predefined tattoo design spaces, strategically mapped to specific areas on the toy's body where tattoo artwork will be applied. The tattoo design spaces are aligned with the toy's anatomical features, allowing the artwork to appear naturally placed when transferred to the plush surface.

FIG. 1.105—Fabric Selection and Preparation

A high-quality polymer-based fabric, such as mink poly fur, is selected for its durability, softness, and suitability for detailed sublimation printing. The fabric is prepared by cutting sections to accommodate the digital pattern dimensions, ensuring that it can hold vibrant, wear-resistant tattoo designs when printed. This fabric preparation step is critical for maintaining the integrity of the sublimation process and ensuring consistent quality across the production line.

FIG. 1.107—Sublimation Printing of Tattoo Artwork

The tattoo artwork is transferred onto the prepared fabric sections using a sublimation printing process. During this step, the fabric is subjected to high temperatures, converting solid dye particles into gas, which permeates the fabric fibers, embedding the tattoo design within the material. This method ensures that the tattoo artwork remains vibrant and resistant to wear, providing a permanent, high-definition image on the plush fabric.

FIG. 1.109—Fabric Cutting and Assembly

Once printed, the tattooed fabric sections are cut according to the digital pattern. Each section is precisely aligned and stitched together to form the plush toy's body structure, with reinforced stitching applied to high-wear areas. This assembly stage is carefully executed to ensure that the tattoo artwork aligns with the predefined tattoo design spaces, giving a natural and cohesive look to the final product.

FIG. 1.111—Stuffing and Final Assembly

The assembled fabric shell is filled with high-quality stuffing material, designed to give the plush toy its intended shape and tactile quality. The final assembly ensures even distribution of the stuffing, maintaining the toy's structural form and comfort. Additional finishing touches, such as seam reinforcement and shape adjustments, are applied as needed to achieve a balanced, durable final product.

FIG. 1.113—Quality Assurance and Finishing

The final plush toy undergoes rigorous quality assurance checks to ensure alignment accuracy, durability, and aesthetic integrity. Inspections are conducted to verify the vibrancy and position of the tattoo artwork, structural integrity, and overall quality. For limited editions, additional checks may be performed to maintain consistency and meet collector standards, ensuring each piece meets the high expectations of the Tattoo Zoo brand.

FIGS. 2A-D illustrate tattooed plush animals according to embodiments of the present invention.

What is claimed is:

1. A method of manufacturing a collectible plush toy with tattoo artwork, comprising the steps of:

a) importing a digital model of a plush toy character in a high-resolution graphic software application;

b) scaling to fit predetermined tattoo design space areas on the digitized plush body in the high-resolution graphic software application, wherein the predetermined areas are strategically placed to enhance visual alignment with the anatomical features of the animal's form conforming to contours of the plush body;

c) precisely mapping a plurality of tattoo designs onto the tattoo space design areas to create a lifelike representation of how the tattoo designs would naturally conform to the three-dimensional structure of the plush toy character;

d) cutting a plurality of flat sections of mink poly fur or another suitable polymer-based fabric to accommodate dimensions of the tattoo designs, e) transferring the tattoo designs onto prepared fabric sections using a sublimation printing process, wherein the prepared fabric sections are printed on at high temperatures so that solid dye particles convert into a gas state and infuse directly into fibers of the prepared fabric sections, f) laying out the tattooed prepared fabric sections precisely aligning to match the digital body pattern seamlessly with the plush animal's 3D structure;

g) stitching together the fabric sections using reinforced stitching techniques to form an assembled fabric shell of the plush toy, and h) filling the assembled fabric shell with stuffing material in an even distribution to form a complete and structured plush toy.

2. The method of claim 1, further comprising the step of applying a thermal protective layer embedded during the poly sublimation process composed of a clear, flexible polymer coating that is imperceptible to touch over the tattoo artwork to enhance resistance to environmental factors and maintain color integrity over time.

* * * * *